(12) United States Patent
Nagata et al.

(10) Patent No.: US 6,583,480 B1
(45) Date of Patent: Jun. 24, 2003

(54) ELECTRO-OPTICAL ELEMENT HAVING PROTECTIVE FILM ON TOP AND SIDE SURFACES OF BUFFER LAYER

(75) Inventors: Hirotoshi Nagata, Funabashi (JP); Yasuyuki Miyama, Funabashi (JP)

(73) Assignee: Sumitomo Osaka Cement Co., Ltd. (JP)

( * ) Notice: Subject to any disclaimer, the term of this patent is extended or adjusted under 35 U.S.C. 154(b) by 7 days.

(21) Appl. No.: 10/019,010

(22) PCT Filed: Jun. 23, 2000

(86) PCT No.: PCT/JP00/04130

§ 371 (c)(1),
(2), (4) Date: Dec. 21, 2001

(87) PCT Pub. No.: WO01/01190

PCT Pub. Date: Jan. 4, 2001

(30) Foreign Application Priority Data

Jun. 28, 1999 (JP) .............................. 11-182512
Jul. 22, 1999 (JP) .............................. 11-208287

(51) Int. Cl.[7] .................................... H01L 31/0232
(52) U.S. Cl. ................... 257/432; 257/98; 257/184; 257/190; 385/8
(58) Field of Search ............... 257/190, 184, 257/432; 385/8

(56) References Cited

U.S. PATENT DOCUMENTS 5,019,519 A  *  5/1991  Tanaka et al. ............... 474/166

FOREIGN PATENT DOCUMENTS

| EP | 07168042 | 7/1995 | |
|----|----------|--------|----|
| JP | 62073207 | 4/1987 | |
| JP | 62173428 | 7/1987 | |
| JP | 03249626 | 11/1991 | |
| JP | 405158005 A | * 6/1993 | ........... G02F/1/035 |
| JP | 06274954 | 9/1994 | |
| JP | 409082930 A | * 3/1997 | ........... H01L/27/14 |
| JP | 9281454 | 10/1997 | |
| JP | 10133158 | 5/1998 | |
| JP | 10274758 | 10/1998 | |

OTHER PUBLICATIONS

"Thin Solid Films", vol. 166, pp. 359–366; 1998, by S. K. Ghosh and T. K. Hatwar; International Conference on Metallurgical Coatings, San Diego, 1988 (Month not available).

* cited by examiner

Primary Examiner—David Nelms
Assistant Examiner—Tu-Tu Ho
(74) Attorney, Agent, or Firm—Baker Botts LLP

(57) ABSTRACT

An electro-optic element comprising a ferroelectric substrate comprising a single crystal having an electro-optic effect, in which an optical waveguide is formed by thermal diffusion of titanium in a main face, and in which an axis in which said electro-optic effect is induced is parallel to said main face; a heat treated buffer layer provided on said ferroelectric substrate on a side in which said optical waveguides are formed; electrodes provided on a part of the buffer layer; and a protective film for preventing contamination of the buffer layer provided on at least the region of the buffer layer on which the electrodes are not formed.

5 Claims, 10 Drawing Sheets

Table 1

| Impurities | Embodiments 1 to 3 | Embodiment 4 | Embodiment 5 | Comparative Example |
|---|---|---|---|---|
| H | $1 \times 10^{21}$ atom/cm$^3$ order | $1 \times 10^{21}$ atom/cm$^3$ order | $1 \times 10^{20}$ atom/cm$^3$ order | $1 \times 10^{22}$ atom/cm$^3$ order |
| Na | $1 \times 10^{17}$ atom/cm$^3$ order | $1 \times 10^{17}$ atom/cm$^3$ order | $1 \times 10^{16}$ atom/cm$^3$ order | $1 \times 10^{20}$ atom/cm$^3$ order |
| K | $1 \times 10^{16}$ atom/cm$^3$ order | Below the SISM detection limit | Below the SISM detection limit | $1 \times 10^{18}$ atom/cm$^3$ order |

ELECTRO-OPTICAL ELEMENT HAVING PROTECTIVE FILM ON TOP AND SIDE SURFACES OF BUFFER LAYER

TECHNICAL FIELD

The present invention relates to an electro-optic element and manufacturing method therefor. In particular, the present invention relates to an electro-optic element which can be suitably used in optical waveguide modulators for optical communications or optical measurement, and to a manufacturing method therefore.

BACKGROUND ART

FIG. 7 is a cross-section showing an example of a conventional optical waveguide modulator.

This optical waveguide modulator comprises a ferroelectric substrate made of lithium niobate ($LiNbO_3$) which is most generally and practically used in ferroelectric substrates for optical waveguide modulators.

In FIG. 7, reference 10 indicates a ferroelectric substrate comprising an X-cut lithium niobate. When this ferroelectric substrate 10 is cut along the X-axis direction (the crystallographic c-axis), which forms the principal optical axis, the Z-cut ferroelectric substrate 10 exhibits the pyroelectric effect (electric-optic effect). As shown in FIG. 7, the axis which exhibits the pyroelectric effect (electric-optic effect) of this ferroelectric substrate 10 is the Z-axis direction (the crystallographic c-axis) which forms the principal optical axis, and as shown in FIG. 7, it is a direction which is parallel to the face (in this specification this is referred to as the "main face") of the ferroelectric substrate 10 in which optical wave guides 2 and 2 are formed.

In the vicinity of the main face of the ferroelectric substrate 10, the optical waveguides 2 and 2 in which Ti has been thermally diffused are formed. Above that, a buffer layer 3 comprising $SiO_2$ is formed. In addition, on to the buffer layer 3, electrodes 4 comprising Au are formed so that they lie parallel to the optical wave guides 2 and 2. A transition metal layer 5 comprising a transition metal such as Ti, Cr, or Ni is provided between these electrodes 4 and the buffer layer 3.

To manufacture this type of optical waveguide modulator, a method is used in which, first, optical waveguides 2 and 2 are formed in the main face of the ferroelectric substrate 10 by a thermal diffusion method. And the buffer layer 3 is formed by means of a vacuum deposition method, a sputtering method, or the like on the side of ferroelectric substrate 10 in which the optical waveguides 2 and 2 are formed. Next, a transition metal film and an Au film are successively formed across the entire surface of the buffer layer 3 by means of a vacuum deposition method. In addition, electrodes 4 are formed on this Au film by using an electrolytic plating method onto only the electrode formation regions which are regions on which the electrodes 4 and 4 are formed. Thereafter, the Au film and the transition metal film which remain between the electrodes 4 and 4 are removed by chemical etching, and the transition metal layer 5 is completed.

As described above, in this optical waveguide modulator, the direction of the Z-axis of the ferroelectric substrate 10 is parallel to the main face of the ferroelectric substrate 10.

In the optical waveguide modulator shown in FIG. 8, the direction of the Z-axis of the ferroelectric substrate 11 is orthogonal to the main face of the ferroelectric substrate 11.

In this optical waveguide modulator, as the surrounding temperature changes, the generation of an electric charge due to the pyroelectric effect between the electrodes 4 and 4 is tend to occur. If the charge due to the pyroelectric effect accumulates between the electrodes 4 and 4, due to a random discharge phenomenon, or the like, the interaction between the electrodes 4 and 4 and the optical waveguides 2 and 2 becomes disturbed, and the modulation conditions of signals of the optical waveguide modulator become noticeably unstable.

Since the direction of the Z-axis of the ferroelectric substrate 10 of the optical waveguide modulator shown in FIG. 7 is parallel to the main face of the ferroelectric substrate 10, the charge which is generated by the pyroelectric effect does not substantially accumulate between the electrodes 4 and 4, and it has the advantage that problems due to the pyroelectric effect do not occur.

However, in this type of optical waveguide modulator, the buffer layer 3 is exposed between the electrodes 4 and 4. Therefore, there is the problem that the surface 3a at which the buffer layer 3 is exposed and the inner part of buffer layer 3 are easily contaminated by contaminants such as K, Ti, and Cr.

In particular, when the density of the buffer layer 3 is lowered by forming the buffer layer 3 using vacuum deposition method in order to regulate the properties of the optical waveguide modulator, it is easy for contaminants to penetrate into the buffer layer 3 through the exposed parts of the buffer layer 3, and this is a problem.

When the surface 3a of the buffer layer 3 and the inner part of the buffer layer 3 of the optical waveguide modulator become contaminated, dc drift may be generated. This dc drift is a phenomenon in which the electric current being applied to the electrodes 4 and 4 leaks through the buffer layer 3 due to the presence of mobile ions such as alkali ions, such as K and Na, and protons, the desired voltage is not applied effectively on the device, and this has a negative impact on the properties of the optical waveguide modulator.

Furthermore, when the contaminants of the buffer layer 3 reach the interface with the ferroelectric substrate 10 due to thermal treatments in the mounting process and the like, due to the contaminants, the chemical bonds of the buffer layer 3 comprising $SiO_2$ are broken, the bonds which bond the ferroelectric substrate 10 comprising lithium niobate and the buffer layer 3 are reduced, and the problem results that the bonding strength between the two is remarkably weakened.

In addition, as another example of a conventional optical waveguide modulator, there is the optical waveguide modulator described in Japanese Unexamined Patent Application, Application No. Sho 60-214024 shown in FIG. 8.

In the same way as the optical waveguide modulator shown in FIG. 7, this optical waveguide modulator uses a ferroelectric substrate comprising lithium niobate ($LiNbO_3$), however, the direction of the Z-axis which exhibits the pyroelectric effect of the ferroelectric substrate is different to that of the optical waveguide modulator shown in FIG. 7.

In FIG. 8, reference 11 indicates a ferroelectric substrate comprising lithium niobate having a Z-cut. The direction of the Z-axis which exhibits the pyroelectric effect of this ferroelectric substrate 11 is orthogonal to the main face of the ferroelectric substrate 11 in which the optical wave guides 2 and 2 are formed.

In the vicinity of the main face of the ferroelectric substrate 11, optical waveguides 2 and 2 comprising Ti are formed, and above that, a buffer layer 3 comprising $SiO_2$ is formed. In addition, onto the buffer layer 3, a semi-conductive film 6 comprising an Si thin film or the like is provided. On this semi-conductive film 6, electrodes 4 comprising Au are formed so that they lie parallel to the optical waveguides 2 and 2.

In this type of optical waveguide modulator, the direction of the Z-axis of the ferroelectric substrate 11 is orthogonal to the main face of the ferroelectric substrate 11. Therefore, when the surrounding temperature changes, an electric charge is readily generated due to the pyroelectric effect between the electrodes 4 and 4. If the charge due to the pyroelectric effect accumulates between the electrodes 4 and 4, due to a random discharge phenomenon, or the like, the interaction between the electrodes 4 and 4 and the optical waveguides 2 and 2 becomes disordered, and the modulation conditions of signals of the optical waveguide modulator become noticeably unstable.

In the optical waveguide modulator shown in FIG. 8, a semi-conductive film 6 is provided on the buffer layer 3. This semi-conductive film 6 responds to the linear electric field induced by the pyroelectric effect, and it makes the charge due to the pyroelectric effect diffuse uniformly over the whole of the semi-conductive film 6. By doing this, even when a pyroelectric effect is generated, the random discharge phenomenon can be suppressed, and it is possible to stabilize the modulation conditions of the signals of the optical waveguide modulator.

However, in this type of optical waveguide modulator, the electrodes 4 and 4 are connected via the semi-conductive film 6. Therefore, when a radio frequency direct current bias is superimposed on and applied to the electrodes 4 and 4, there is the problem of lack of stability with respect to this application and, in particular, to the application of the direct current component. Consequently, this is not desirable when this optical waveguide modulator is operated for long periods of time.

As an optical waveguide modulator which solves these types of problems, the optical waveguide modulator described in Japanese Unexamined Patent Application, Application No. Sho 61-16307 and shown in FIG. 9 has been proposed.

The optical waveguide modulator shown in FIG. 9 differs from the optical waveguide modulator shown in FIG. 8 in that the semi-conductive film 61 is divided by portions on whose upper surfaces electrodes 4 and 4 are not formed.

In this type of optical waveguide modulator, because the semi-conductive film 61 is divided by portions on whose upper surfaces electrodes 4 and 4 are not formed, even when radio frequency direct current bias is superimposed and applied, there is no degradation in the stability with respect to the application conditions.

However, in this type of optical waveguide modulator, since the buffer layer 3 is exposed at those portions where the semi-conductive film 61 is divided between the electrodes 4 and 4, the surface 3b of the buffer layer 3 which is exposed and the inner portion of the buffer layer 3 are readily contaminated by contaminants, and the same problems as occur with the optical waveguide modulator shown in FIG. 7 occur.

DISCLOSURE OF INVENTION

In consideration of the above situations, the present invention aims to solve the above-mentioned problems and has an object of providing an electro-optic element in which the accumulation of charge generated due to the pyroelectric effect is less likely to occur, and in which contamination of the surface of the buffer layer and the inner portion of the buffer layer is less likely to occur.

In addition, the present invention has an object of providing a manufacturing method for the above-mentioned electro-optic element.

In order to achieve the above-mentioned objects, the electro-optic element of the present invention comprises a ferroelectric substrate comprising a single crystal having an electro-optic effect, in which an optical waveguide is formed by thermal diffusion of titanium in the main face, and in which an axis in which the above-mentioned electro-optic effect is induced is in a direction parallel to the above-mentioned main face; a heat treated buffer layer provided on the above-mentioned ferroelectric substrate on a side in which the above-mentioned optical waveguides are formed; electrodes provided on a part of the above-mentioned buffer layer; and a protective film for preventing the contamination of the buffer layer, which is provided on at least the region of the buffer layer on which the electrodes are not formed.

Here the "main face" means the face of the ferroelectric substrate, in which the optical waveguides are formed.

The structure of the electro-optic element of the present invention is basically such that the axis in which the electro-optic effect of the ferroelectric substrate is induced is parallel to the main face of the ferroelectric substrate. This corresponds to the example of a conventional optical waveguide modulator shown in FIG. 7.

In the electro-optic element of the present invention, since the axis in which the electro-optic effect of the ferroelectric substrate is induced is parallel to the main face of the above-mentioned ferroelectric substrate, the charge which is generated by the electro-optic effect is essentially not stored between the electrodes, and problems resulting from the pyroelectric effect do not occur.

In addition, in the electro-optic element of the present invention, since a protective film is provided on at least the region of the above-mentioned buffer layer on which the above-mentioned electrodes are not formed, the surface of the buffer layer is not exposed. For this reason, the electro-optic element is such that it is difficult for the surface of the buffer layer and inner portion of the buffer layer to be contaminated.

Consequently, it is possible to prevent leakage of the electric current applied to the electrodes due to contaminants in the surface of the buffer layer and within the buffer layer, and it is possible to ensure the stability of the operation of the electro-optic element. Consequently, even if the direct current bias is superimposed and applied at radio frequency to the electrodes, it has excellent stability with respect to the application conditions. In addition, it is possible to prevent the generation of dc drift.

In addition, since it is difficult for the buffer layer to be contaminated, it is less likely for weakness in the bonding strength of the buffer layer and the ferroelectric substrate which results from contamination of the buffer layer to occur.

In the above-mentioned electro-optic element, it is preferable for the above-mentioned protective film to be provided over an entire surface of the above-mentioned buffer layer including regions on which the above-mentioned electrodes are formed.

By means of making this type of electro-optic element, the whole surface of the buffer layer is covered by the protective film and it is possible to prevent contamination of the buffer layer during the manufacturing process of the electro-optic element after the protective film has been formed, and it is possible to prevent even further penetration of contaminants into the buffer layer.

In addition, since the protective film is formed on the entire surface of the buffer layer, it is easier to form the protective film compared with a situation in which the protective film is formed on a part of the surface of the buffer layer.

In the above-mentioned electro-optic element, it is preferable for said protective film to be also provided on the side surfaces of said buffer layer with respect to the optical waveguide direction.

By making this type of electro-optic element, the side surfaces of the above-mentioned buffer layer with respect to the direction of the optical waveguides are covered by the protective film, and therefore, it is possible to prevent even more the penetration of contaminants into the buffer layer.

In addition, it is preferable for the above-mentioned protective film provided on the top of said buffer layer and the protective film provided on the side surfaces of said buffer layer with respect to the optical waveguide direction to be made of the same material.

By means of making this type of electro-optic element, it is possible to increase the chemical bonding strength of the protective film provided on the buffer layer and the protective film provided on the side surfaces of the buffer layer with respect to the optical waveguide direction. Furthermore, since the thermal expansion properties of the protective film provided on the top of the buffer layer and the protective film provided on the sides of the buffer layer are the same, the adhesiveness at the interface between the protective film provided on the top of the buffer layer and the protective film provided on the side surfaces of the buffer layer is thermally stable. As a result, it is possible to improve the effect of the protective film in preventing penetration of contaminants into the buffer layer, and it is possible to obtain even greater stability.

In the above-mentioned electro-optic element, it is preferable for the above-mentioned protective film to be an amorphous film.

Compared with a crystalline film, an amorphous film has structural continuity, and is dense. For this reason, by making the protective film an amorphous film, it is possible to form an electro-optic element in which it is even more difficult for the surface of the buffer layer and the inside of the buffer layer to be contaminated.

In addition, in the above-mentioned electro-optic element, it is preferable for the above-mentioned protective film to be electrically insulative.

Here, "electrically insulative" means a direct current resistance of greater than 20 MΩ and preferably greater than 50 MΩ.

By making this type of electro-optic element, it is possible to prevent with even greater certainty leakage of the current applied to the electrodes and it is possible to ensure the stability of the operation of the electro-optic element. Consequently, it is possible to improve even further the effect of preventing the generation of dc drift.

In addition, it is preferable for the protective film to comprise at least one type selected from the group consisting of silicon (Si), silicon carbide (Si—C), and silicon nitride (Si—N).

In this type of electro-optic element, since the protective film comprises at least one type selected from the group consisting of silicon (Si), silicon carbide (Si—C), and silicon nitride (Si—N) which contain Si and which have high covalency, absorption of moisture is less likely to occur compared with $SiO_2$. In addition, when the buffer layer comprises $SiO_2$, the operation of the protective film in preventing the penetration of contaminants into the buffer layer is even better, and it is even more difficult for contamination of the buffer layer to occur.

In addition, since the protective film comprising at least one selected from the group consisting of silicon (Si), silicon carbide (Si—C), and silicon nitride (Si—N) does not contain oxygen, even when a transition metal layer is formed from a chemically active transition metal such as Ti on the protective film, there is no oxidative degradation of the transition metal layer and it is possible to obtain a stable film bonding strength.

Furthermore, it is preferable for the above-mentioned ferroelectric substrate of the electro-optic element to comprise lithium niobate.

With single crystals of lithium niobate, it is possible to realize large size integrated devices by making the ferroelectric substrate from lithium niobate since it is comparatively easy to grow large size crystals.

In addition, since the Curie point of single crystals of lithium niobate is approximately as high as 1000° C., the degree of freedom for temperatures in the manufacturing process of electro-optic element is larger.

In addition, in order to overcome the above-mentioned problems, the manufacturing method for electro-optic elements of the present invention comprises a step of forming optical waveguides in a surface of a ferroelectric substrate comprising a single crystal having an electro-optic effect, in which the axis in which the above-mentioned electro-optic effect is induced is parallel to the main face; a step of forming a buffer layer on top of the above-mentioned ferroelectric substrate on the side in which the above-mentioned optical waveguides are formed; a step of forming a protective film for preventing contamination of the above-mentioned buffer layer on at least the regions of the above-mentioned buffer layer which are not the electrode forming regions; and a step of forming electrodes on the above-mentioned electrode forming regions.

By means of this type of manufacturing method for the electro-optic element, it is possible to easily obtain the above-mentioned electro-optic element.

Table 1 shows the amount of impurity which penetrate into a buffer layer in various embodiments of the invention and a comparative example.

MODES FOR CARRYING OUT THE INVENTION

In the following, the present invention will be explained in detail.

Figure 1:
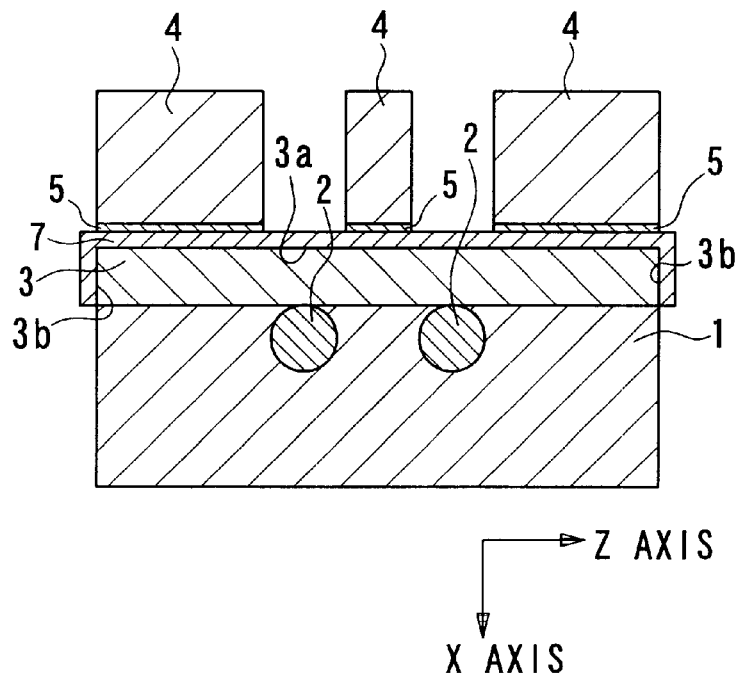
FIG. 1 is a cross section showing an example of an optical waveguide modulator comprising an electro-optic element according to the present invention.

FIG. 1 is a cross section showing an embodiment of an optical waveguide modulator comprising an electro-optic element according to the present invention.

This optical waveguide modulator uses a ferroelectric substrate comprising lithium niobate ($LiNbO_3$) which is most generally and practically used in optical waveguide modulators which use ferroelectric substrates In FIG. 1, reference 1 indicates a ferroelectric substrate comprising an X-cut lithium niobate. The axis which exhibits the pyroelectric effect of the ferroelectric substrate 1 is the direction of the Z-axis (the crystallographic c-axis) which is the main optical axis, and as shown in FIG. 1, it is parallel to the main face of the ferroelectric substrate 1.

In the main face of the ferroelectric substrate 1, optical waveguides 2 and 2 which are formed by thermal diffusion of Ti are formed. The optical waveguide direction of this optical waveguide modulator is the lengthwise direction of the optical waveguides 2 and 2. A buffer layer 3 comprising $SiO_2$ is formed on the waveguides 2 and 2. A protective film 7 is formed over the whole of surface 3a of the buffer layer 3 and the side surfaces 3b of the buffer layer 3 with respect to the optical waveguide direction. Furthermore, electrodes 4 comprising Au are formed running parallel to the optical waveguides 2 and 2 on this protective film 7. Note that in FIG. 1, the electrode 4 which is positioned in the center is a signal electrode, and the electrodes 4 positioned on either side of are earthed electrodes. Between these electrodes 4 and the protective film 7, a transition metal layer 5 comprising a transition metal such as Ti, Cr, or Ni is provided.

In this optical waveguide modulator, the above-mentioned protective film 7 is an amorphous film having electrically insulating properties and comprises at least one type selected from silicon (Si), silicon carbide (Si—C), and silicon nitride (Si—N).

To manufacture this type of optical waveguide modulator, first, optical waveguides 2 and 2 are formed in the surface of the ferroelectric substrate 1 by a thermal diffusion method. A buffer layer 3 is formed by means of a vacuum deposition method on the side of the ferroelectric substrate 1 in which the optical waveguides 2 and 2 are formed. At this time, in order to sufficiently oxidize the buffer layer 3, a heat treatment (annealing) is carried out for 5 to 10 hours in an oxidizing atmosphere at a temperature of 500 to 700° C. Next, the ferroelectric substrate 1 on which the buffer layer 3 has been formed is arranged in a film forming device for forming a protective film 7, and the protective film 7 is formed over the entirety of surface 3a of buffer layer 3 by means of a sputtering method. At this time, prior to the formation of the protection film 7, a heat treatment may be carried out with the purpose of removing the water content ($H_2O$, —OH) of the buffer layer 3, and further strengthening the protective film 7.

Thereafter, a transition metal film and an Au film are successively formed by means of a vacuum deposition method or a sputtering method. In addition, electrodes 4 and 4 are formed on this Au film by using an electrolytic plating method onto only the electrode formation regions which are the regions on which the electrodes 4 and 4 are formed. Thereafter, the Au film and the transition metal film which remain between the electrodes 4 and 4 are removed by chemical etching, and thereby a transition metal layer 5 is formed only under the electrodes 4 and 4.

Next, the ferroelectric substrate 1 is cut to match the shape of the chip, and the protective layer 7 is formed on the side surfaces 3b of the buffer layer 3. In the formation of the protective film 7 on side surfaces 3b of the buffer layer 3, portions other than the side surfaces 3b of the buffer 3 are protected by the use of a resist or the like, and thereafter the protective film 7 is formed by a sputtering method or the like in the same way as the protective film 7 formed on the buffer layer 3.

In the above-mentioned manufacturing method, the formation of the protective film 7 may be carried out while heating, or after the completion of a heat treatment. The conditions of the heat treatment at this stage are, for example, a temperature of 100 to 300° C., a treatment time of 1 to 20 hours, and a degree of vacuum of $1 \times 10^{-5}$ to $1 \times 10^{-1}$ Pa.

In addition, using a case in which the protective film 7 comprises Si as an example, the formation of the protective film 7 is carried out using a method in which radio frequency sputtering is conducted using silicon which has not been doped with impurities as a target and using Ar gas as the sputtering gas.

At this time, when the temperature of the ferroelectric substrate 1 is about 250° C., a suitable Si film having few defect is grown, and it is possible to obtain a Si film which has an extremely high electrical resistance and which is essentially an insulator.

In addition, a protective film 7 comprising Si—N, for example, can be obtained by using the same method as for the above-mentioned protective film 7 comprising Si using a gas mixture of Ar gas and nitrogen gas as the sputtering gas.

In addition, a protective film 7 comprising Si—C, for example, can be obtained by using the same method as for the above-mentioned protective film 7 comprising Si using highly pure SiC as the target.

In this type of optical waveguide modulator, the axis in which the pyroelectric effect of the ferroelectric substrate 1 is induced is in a direction parallel to the main face of the ferroelectric substrate 1. Therefore, the charge generated by the pyroelectric effect does not accumulate between the electrodes, and no problems arise due to the pyroelectric effect.

In addition, in this type of optical waveguide modulator, since a protective film 7 is provided over the entirety of the surface 3a and the side surfaces 3b of the buffer layer 3, the surface 3a and the side surface 3b of the buffer layer 3 are not exposed, and it is difficult for the surface of buffer layer 3 and the inner portion of the buffer layer 3 to be contaminated.

In addition, since the protective film 7 has electrically insulating properties, it is possible to prevent leakage of the electric current which is applied to the electrodes, and it is possible to ensure the stability of the operation of the optical waveguide modulator. Consequently, it is possible to prevent the occurrence of dc drift. In addition, since it is difficult for the buffer layer 3 to be contaminated, reductions in the bonding strength of the ferroelectric substrate 1 and the buffer layer 3 which is induced by contamination of the buffer layer 3 do not occur.

Moreover, since it is difficult for the buffer layer 3 to be contaminated, it is difficult for problems induced by contamination to occur even if the density of the buffer layer 3 is low, and therefore it is possible to form the buffer layer 3 by means of a vacuum deposition method by which a buffer layer 3 having a low density is formed. In addition, it is possible to select the method of formation and the density of the buffer layer 3 in accordance with need.

In addition, since the protective film 7 is provided between the buffer layer 3 and the transition metal layer 5 which is provided below the electrodes 4 and 4, and since the entirety of the surface 3a of buffer layer 3 is covered by the protective film 7, it is possible to prevent contamination of the buffer layer 3 during manufacturing processes for the optical waveguide modulator which are performed after the protective film 7 is formed.

In other words, it is possible to prevent contamination of the buffer layer 3 due to processes such as the chemical etching of the Au film and the transition metal film during the processes of forming the transition metal layer 5 and the electrodes 4 and 4 on the protective film 7.

In addition, since a protective film 7 is formed between the buffer layer 3 and the transition metal layer 5, there is no contact between the buffer layer 3 and the transition metal layer 5, it is possible to prevent phenomenon which reduce the reliability of the optical waveguide modulator which is caused by oxidation of the transition metal layer 5 due to oxygen and moisture adhered to the buffer layer 3, brittle of the transition metal layer 5, and the degradation of the bonding strength between the buffer layer 3 and transition metal layer 5.

In addition, by forming the protective film 7 over the entirety of surface 3a of the buffer layer 3, the formation of the protective film 7 is easier compared with formation of a protective film 7 on a part of the surface 3a of the buffer layer 3.

In addition, the protective layer 7 comprises one type selected from the group consisting of silicon (Si), silicon carbide (Si—C), and silicon nitride (Si—N) which contain Si and have high covalency, and the buffer layer 3 comprises $SiO_2$. Therefore, the protective film 7 absorbs moisture less readily and has excellent actions for preventing the penetration of contaminants into the buffer layer 3 when compared with the $SiO_2$ which forms the buffer layer 3.

In addition, the protective film 7 which comprises at least one type selected from silicon (Si), silicon carbide (Si—C), and silicon nitride (Si—N) does not contain oxygen. Therefore, there is no oxidative degradation of the transition metal layer 5 formed on the protective film 7. Consequently, there is no concern that the transition metal layer 5 will become brittle, or that the bonding strength between the buffer layer 3 and transition metal layer 5 will be degraded due to the oxidation of the transition metal layer 5, and thereby it is possible to improve the reliability of the optical waveguide modulator.

In addition, since the ferroelectric substrate 1 comprises lithium niobate for which the growth of large size crystals is comparatively easy, it is possible to realize large size integrated devices.

In addition, since the Curie point of single crystals of lithium niobate is as high as approximately 1000° C., it is possible to improve the degree of freedom of the temperature of the manufacturing processes of the electro-optic element.

In addition, since the transition metal layer 5 is provided between the electrode 4 and the protective film 7, it is possible to improve the bonding strength of the electrode 4 and the protective film 7.

More specifically, the transition metal layer 5 forms an alloy (solid) or a metal phase compound at the boundary between the transition metal layer 5 and the electrode 4 comprising the Au which is chemically inactive, and is chemically adhered to or incorporated with the protective film 7 at their boundary, and therefore the transition metal layer 5 functions as an adhesive which binds the electrode 4 and the protective film 7. Consequently, it is possible to improve the bonding strength of the electrode 4 and the protective film 7.

Moreover, since the entire protective film 7 is made using a uniform material, it is possible for manufacture to be easy due to fewer manufacturing steps.

Furthermore, in the above-mentioned manufacturing method, since the protective film 7 is formed by means of a sputtering method, it is possible to form the protective film 7 easily.

Moreover, since the protective film 7 is formed after heat treating the ferroelectric substrate 1 on which the buffer layer 3 has been formed in the film forming device for forming the protective film 7, it is possible to obtain an optical waveguide modulator which is superior in operating stability. In more detail, the buffer layer 3 of the electro-optic element absorbs moisture during the period from formation of the buffer layer until formation of the protective film, and this may have a negative effect on the operating stability of the electro-optic element. In particular, when the density of the buffer layer is low, the buffer layer very readily absorbs moisture from the atmosphere. According to the above-mentioned manufacturing method, the protective film 7 is formed after heat treatment of the ferroelectric substrate 1 on which the buffer layer 3 has been formed in the film forming device for forming the protective film 7, and even if the buffer layer 3 absorbs moisture during the period from formation of the buffer layer 3 until the formation of the protective film 7, that moisture can be removed in the heat treatment. Consequently, it is possible to obtain an optical waveguide modulator having superior operating stability.

This type of optical waveguide modulator is preferably used when the object is zero chirping, polarization non-dependence, or the like.

In the electro-optic element of the present invention, it is preferable for a protective film 7 to be formed on the entirety of surface 3a and the side surface 3b of buffer layer 3 as shown in FIG. 1, however, at the least, it is satisfactory to provide the protective film only on the portion of buffer layer 3 on which the electrodes 4 and 4 are not formed.

Figure 2:
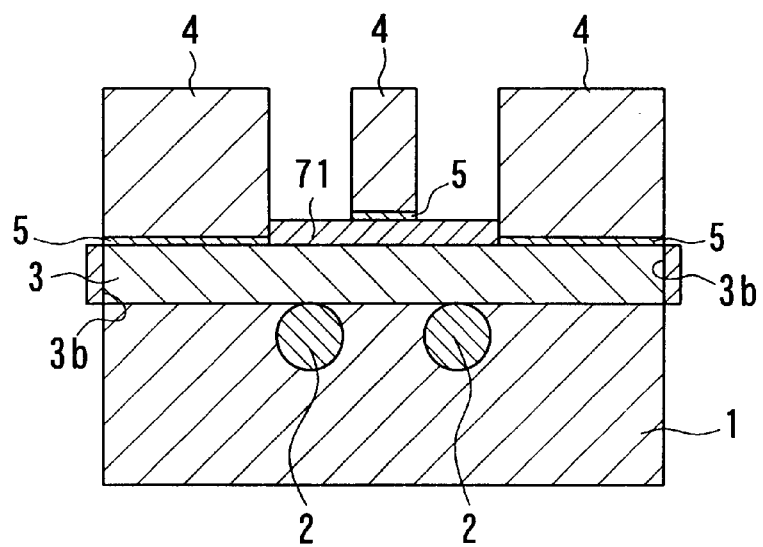
FIG. 2 is a cross section showing an example of an optical waveguide modulator comprising an electro-optic element according to the present invention.
Figure 3:
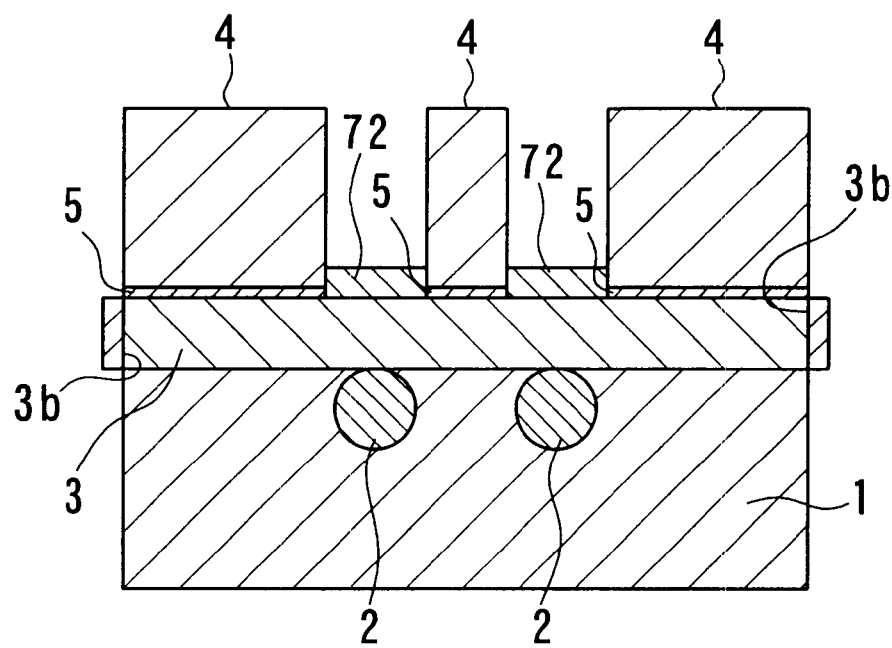
FIG. 3 is a cross section showing another example of an optical waveguide modulator comprising an electro-optic element according to the present invention.

For example, as shown in FIG. 2, a protective film 71 may be formed on buffer layer 3 on the parts on which electrodes 4 and 4 are not formed, between the buffer layer 3 and one of the electrodes 4, and on the side surfaces 3b of the buffer layer 3. In addition, as shown in FIG. 3, a protective film 72 may be provided on buffer layer 3 on the parts on which electrodes 4 and 4 are not formed, and on the side surfaces 3b of buffer layer 3.

Figure 4:
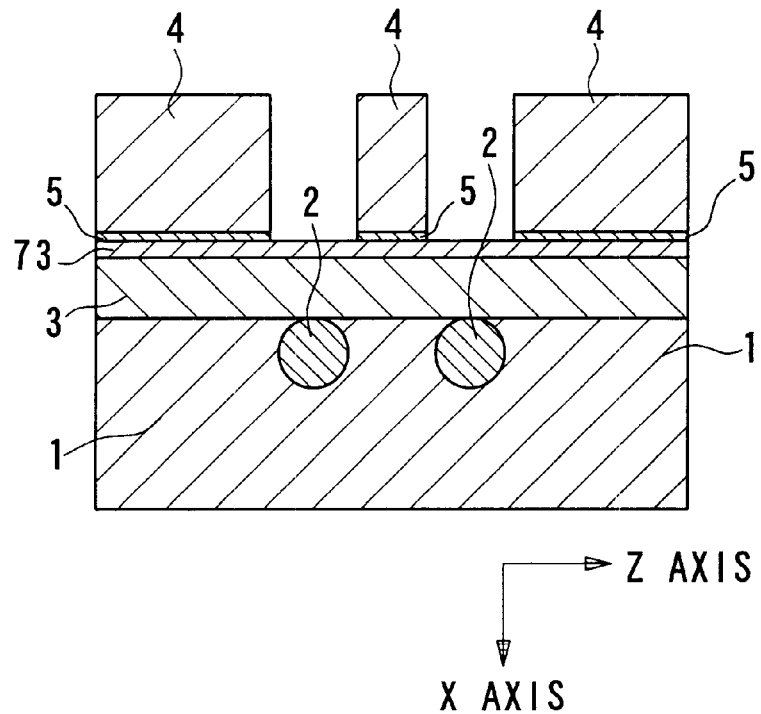
FIG. 4 is a cross section showing another example of an optical waveguide modulator comprising an electro-optic element according to the present invention.
Figure 5:
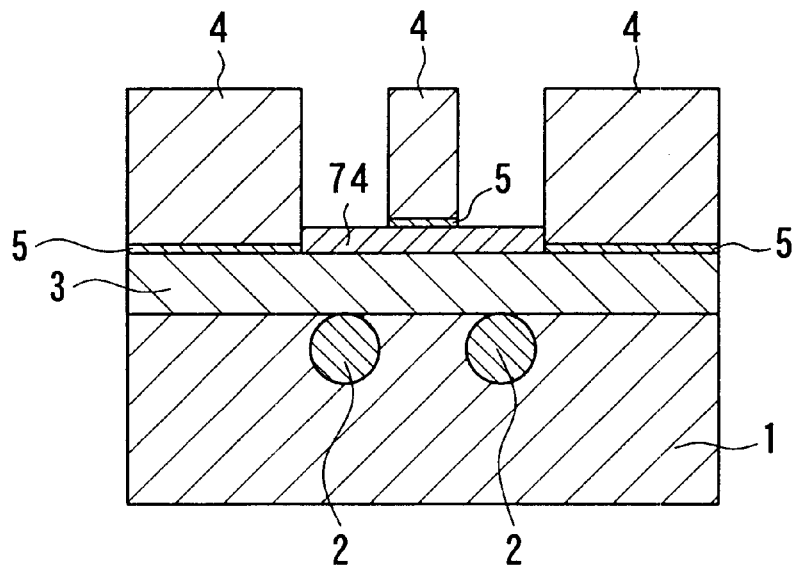
FIG. 5 is a cross section showing another example of an optical waveguide modulator comprising an electro-optic element according to the present invention.
Figure 6:
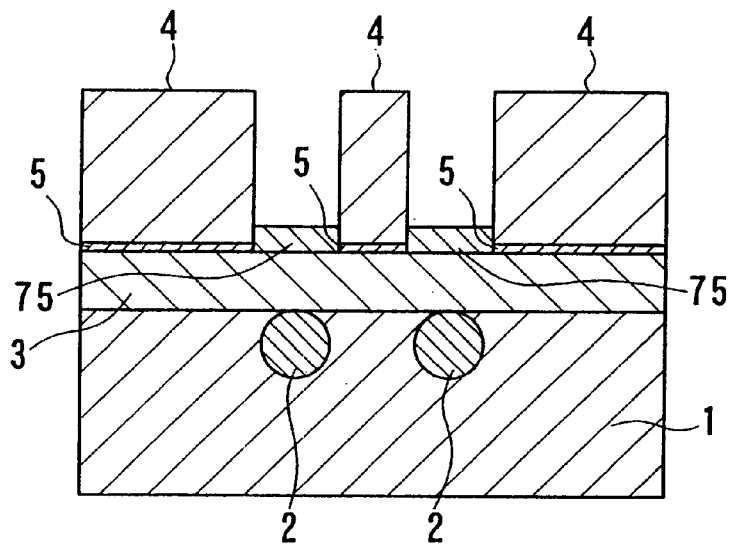
FIG. 6 is a cross section showing another example of an optical waveguide modulator comprising an electro-optic element according to the present invention.

In addition, as shown in FIG. 4, a protective film 73 may be provided over the entirety of surface 3a of the buffer layer 3. As shown in FIG. 5, a protective film 74 may be provided on buffer layer 3 on the portions on which electrodes 4 and 4 are not formed, and between the buffer layer 3 and one of the electrodes 4 and 4. Furthermore, as shown in FIG. 6, a protective film 75 may be provided on the buffer layer 3 on the portions on which electrodes 4 and 4 are not formed.

In this type of electro-optic element, the surface 3a of the buffer layer 3 is not exposed, and it is difficult for the surface 3a of the buffer layer 3 and the inside of the buffer layer 3 to be contaminated.

In the electro-optic element of the present invention, as shown in the above-discussed examples, the protective film is made into an amorphous film having electrically insulating properties, and it is not particularly limited as long as it is able to prevent contamination of the buffer layer 3.

In the electro-optic element of the present invention, as shown in the above-mentioned examples, a ferroelectric substrate 1 is used which comprises an X-cut lithium niobate. However, as long as the ferroelectric substrate 1 comprises a single crystal having an electro-optic effect, and the axis which exhibits the electro-optic effect of the ferroelectric substrate 1 is in a direction parallel to the main face, it is suitable. For example, a ferroelectric substrate 1 comprising a Y-cut lithium niobate may be used.

In addition, in the electro-optic element of the present invention, as shown in the above-discussed examples, it is preferable to use a ferroelectric substrate comprising lithium niobate as the ferroelectric substrate. However, the ferroelectric substrate is not limited to only lithium niobate, and it is possible to use lithium tantalate, for example.

In the electro-optic element of the present invention, as shown in the above-discussed examples, a transition metal layer 5 may be provided between the electrodes 4 and the protective film 7. However, the present invention is not limited to this, and a protective film 7 need not be provided.

Moreover, in the electro-optic element of the present invention, as shown in the above-described examples, it is preferable in consideration of the transmission of radio frequency electric signals in the electrodes 4 for the buffer layer 3 to comprise $SiO_2$ which has a low dielectric constant, and for the electrodes 4 to comprise Au which has a sufficiently low electrical resistance. However, the materials which form the buffer layer 3 and the electrodes 4 are not limited to the materials described above.

In addition, in the electro-optic element of the present invention, as shown in the above-mentioned examples, the entire protective film may comprise a material. However, the present invention is not limited to this, and it is possible, for example, for the protective film provided on the buffer layer and the protective film provided on the side surfaces of the buffer layer to comprise different materials.

In the manufacturing method of the electro-optic element of the present invention, as shown in the above-described examples, the buffer layer 3 may be formed by means of a vacuum deposition method. However, this is not limited to a vacuum deposition method, and a buffer layer having high density formed by means of a high energy film forming method, such as sputtering, may be provided.

In addition, in the electro-optic element of the present invention and the manufacturing method therefore, due to individual differences caused in the manufacturing processes, it is possible for some regions of the buffer layer 3 of the electro-optic element on which electrodes 4 have not been formed to not be completely covered by the protective film. However, even if a protective film is not formed on a part of the region of buffer layer 3 on which electrodes 4 are not formed, the purposes of the present invention can still be obtained if the protective film is formed on almost all of the region of buffer layer 3 on which the electrodes 4 are not formed.

EMBODIMENTS

In the following, the present invention will be explained in more detail using embodiments.

Embodiment 1

On the surface of a ferroelectric substrate 1 comprising an X-cut lithium niobate, optical waveguides 2 and 2 were formed by means of conducting a diffusion treatment for 20 hours at a 1000° C. in an oxygen atmosphere on a diffused-type optical waveguide pattern comprising Ti and having a thickness of 90 nm, and thereon a $SiO_2$ film having a thickness of 1 μm was formed by vacuum deposition to form a buffer layer 3. In addition, after conducting a heat treatment for 5 hours at a temperature of 600° C. in under an oxygen flow, and a protective film 73 having a thickness of 100 nm and comprising Si was formed on the entire upper surface of buffer layer 3 by means of conducting radio frequency sputtering using silicon which had not been doped with impurities as the target, and using argon gas as the sputtering gas, with the ferroelectric substrate 1 at a temperature of 250° C.

Next, onto this protective film 73, a transition metal film comprising Ti and having a thickness of 50 nm and an Au film having a thickness of 50 nm were consecutively formed by means of a vacuum deposition method within the same vacuum device. Then, a resist pattern was formed on this Au film using photolithography technology, and electrodes 4 were formed only on the part on which the resist mask had not been formed, in other words, on the exposed part of the Au film by using an electroplating method. Next, the resist mask was removed using an organic solvent, and the Au film which remained between the electrodes 4 and 4 was removed by etching using iodine potassium iodide and ammonia/hydrogen peroxide aqueous mix, and thereby, the optical waveguide modulator shown in FIG. 4 was obtained.

Embodiment 2

Using the same type of ferroelectric substrate 1 used in Embodiment 1, optical waveguides 2 and 2 and a buffer layer 3 were formed in the same manner as in Embodiment 1. Then, on to the entire upper surface of the buffer layer 3, a protective film 73 comprising $Si_3N_4$ and having a thickness of 100 nm was formed in the same way as in Embodiment 1 using a gas mixture of Ar gas and nitrogen gas as the sputtering gas.

Next, a transition metal layer 5 and electrodes 4 were formed on this protective film 73 in the same manner as in Embodiment 1, to obtain the optical waveguide modulator shown in FIG. 4.

Embodiment 3

Using the same type of ferroelectric substrate 1 used in Embodiment 1, optical waveguides 2 and 2 and a buffer layer 3 were formed in the same manner as in Embodiment 1. Then, on to the entire upper surface of the buffer layer 3, a protective film 73 comprising SiC and having a thickness of 100 nm was formed in the same way as in Embodiment 1 using highly pure SiC as the target.

Next, a transition metal layer 5 and electrodes 4 were formed on this protective film 73 in the same manner as in Embodiment 1, to obtain the optical waveguide modulator shown in FIG. 4.

Embodiment 4

Using the same type of ferroelectric substrate 1 used in Embodiment 1, optical waveguides 2 and 2 and a buffer layer 3 were formed in the same manner as in Embodiment 1. Then, after the whole of the ferroelectric substrate 1 was heat treated at 250° C. within a sputtering device, the temperature was allowed to fall, and then a protective film 73 comprising Si and having a thickness of 100 nm was formed by means of a sputtering method at room temperature and using Ar gas as the sputtering gas. The protective film 73 displayed so-called semi-conductivity in which the electrical resistance decreases as the temperature increases, and the electrical resistance at room temperature was 30 to 40 MΩ.

Next, a transition metal layer 5 and electrodes 4 were formed on this protective film 73 in the same manner as in Embodiment 1 and thereby the optical waveguide modulator shown in FIG. 4 was obtained.

Embodiment 5

Using the same type of ferroelectric substrate 1 used in Embodiment 1, optical waveguides 2 and 2 and a buffer layer 3 were formed in the same manner as in Embodiment 1. Then, after the whole of the ferroelectric substrate 1 was heat treated at 250° C. within a sputtering device, the temperature was allowed to fall, and then a protective film 7 comprising Si and having a thickness of 100 nm was formed by means of a sputtering method at room temperature and using Ar gas as the sputtering gas. The protective film 7 displayed so-called semi-conductivity in which the electrical resistance decreases as the temperature increases, and the electrical resistance at room temperature was 30 to 40 MΩ.

Next, a transition metal layer 5 and electrodes 4 were formed on this protective film 7 in the same manner as in Embodiment 1.

Thereafter, the ferroelectric substrate 1 was cut to match the shape of a chip, the parts of the buffer layer 3 other than side surface 3b were protected using resist or the like, and a protective film 7 was formed on the side surfaces 3b of the buffer layer 3 by means of the same method as for the protective film 7 formed on the buffer layer 3. Thereby, an optical waveguide modulator as shown in FIG. 1 was obtained.

CONVENTIONAL EXAMPLE 1

Figure 7:
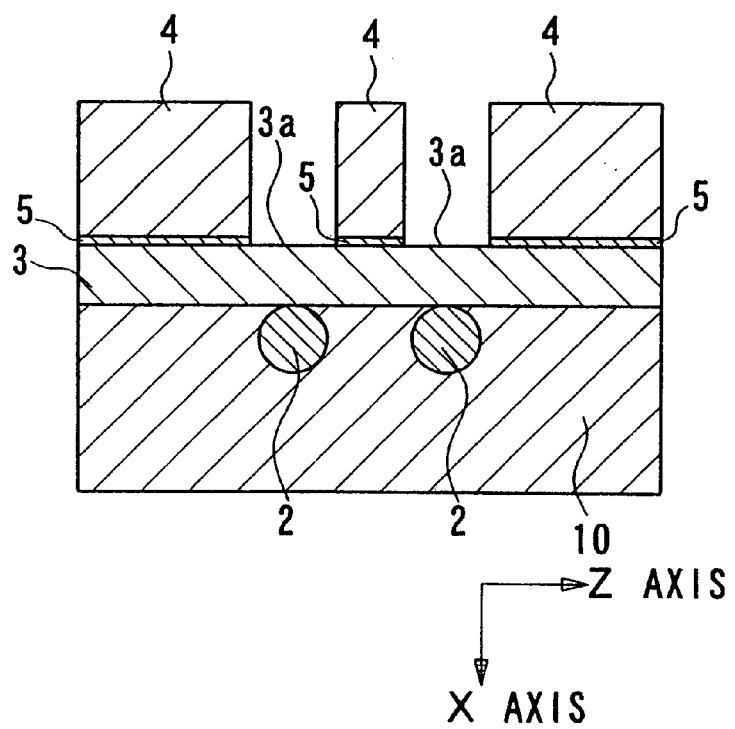
FIG. 7 is a cross section showing an example of a conventional optical waveguide modulator.
Figure 8:
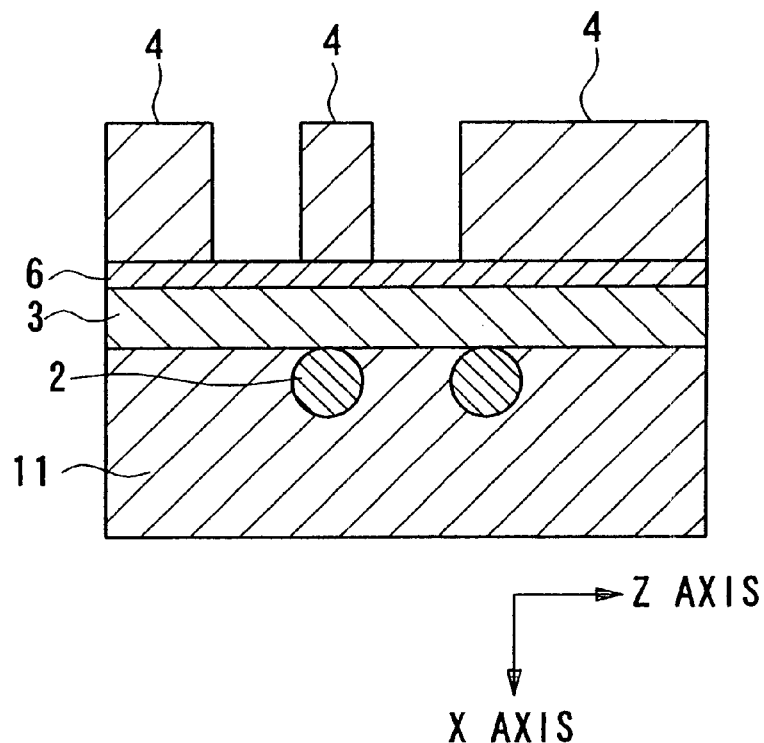
FIG. 8 is a cross section showing another example of a conventional optical waveguide modulator.
Figure 9:
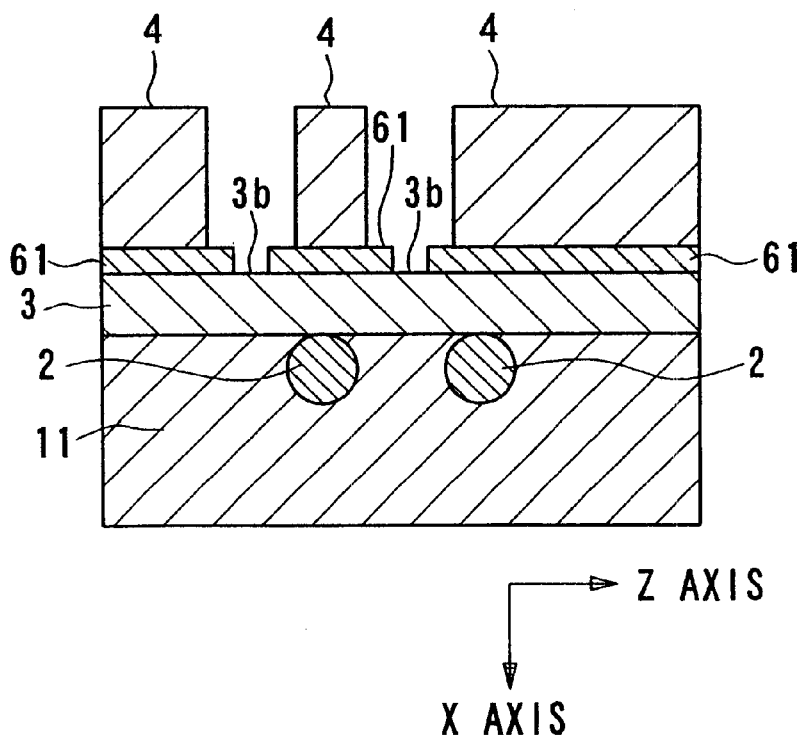
FIG. 9 is a cross section showing another example of a conventional optical waveguide modulator.

Using the same type of ferroelectric substrate 1 used in Embodiment 1, optical waveguides 2 and 2 and a buffer layer 3 were formed in the same manner as in Embodiment 1. Then, a transition metal layer 5 and electrodes 4 were formed on the buffer layer 3 in the same way as in Embodiment 1 and thereby the optical waveguide modulator shown in FIG. 7 was obtained.

Each of the buffer layers 3 of optical waveguide modulators of the Embodiment 1 to Embodiment 4, and the Conventional Example 1 obtained in the above-described ways were subjected to secondary ion mass spectrometry (SIMS) in the depth wise direction, and the contamination conditions of the buffer layers 3 were measured.

Figure 12:
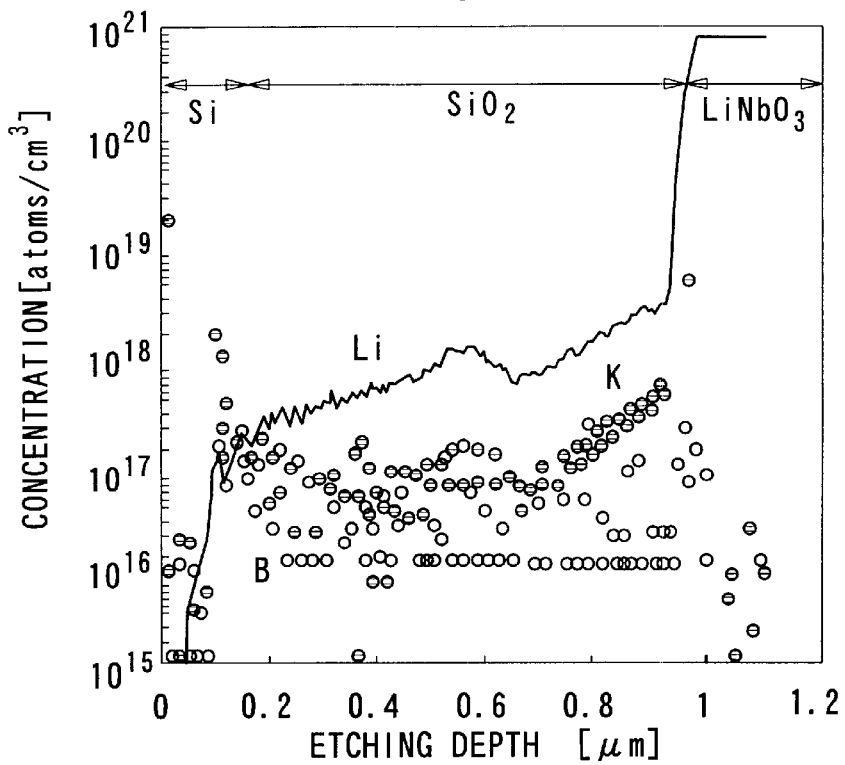
FIG. 12 is a graph showing the contamination condition in the depth wise direction of buffer layer of Embodiment 1.
Figure 13:
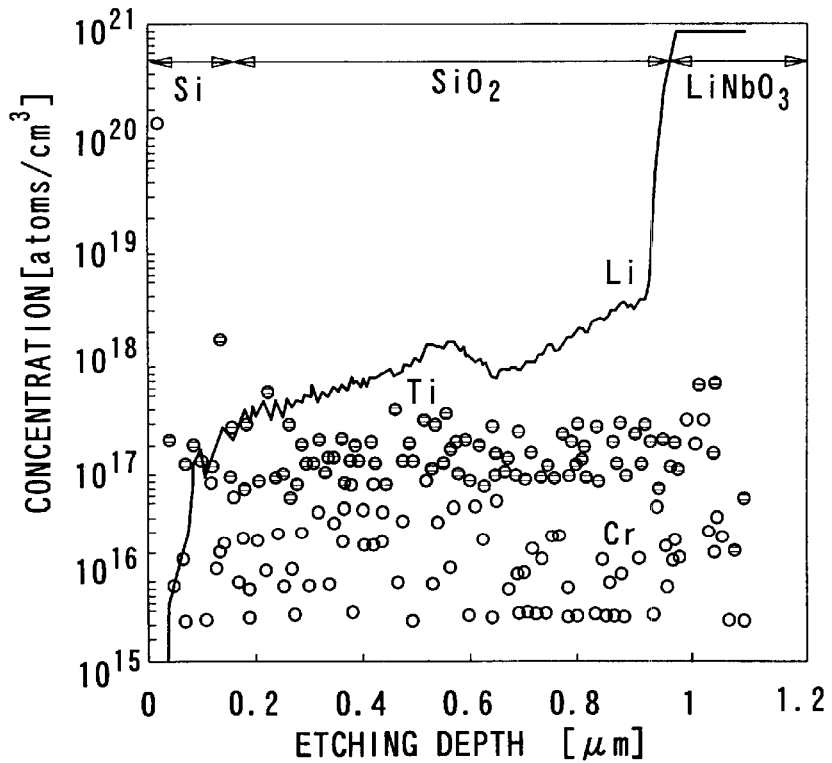
FIG. 13 is a graph showing the contamination condition in the depth wise direction of buffer layer of Embodiment 1.
Figure 14:
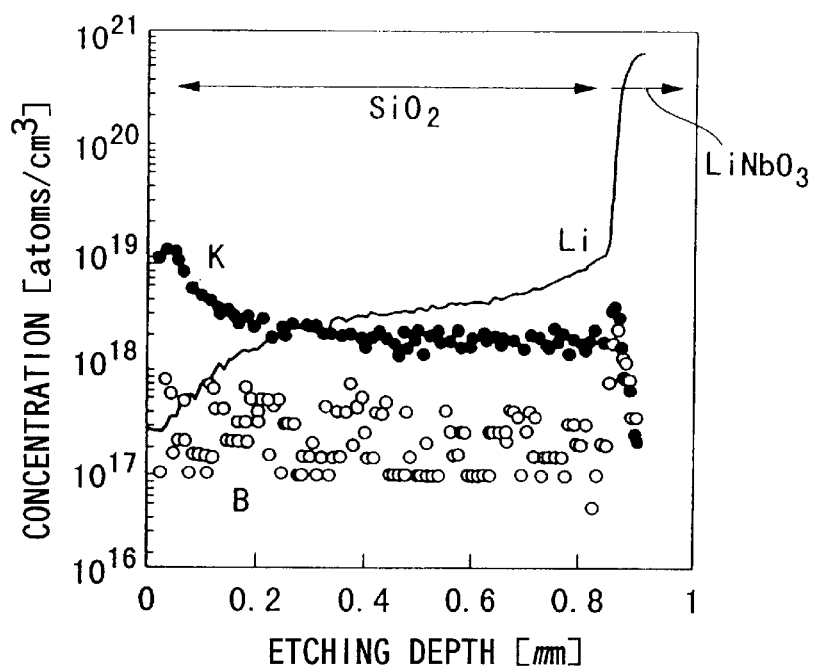
FIG. 14 is a graph showing the contamination condition in the depth wise direction of buffer layer of optical waveguide modulator shown in FIG. 7.
Figure 15:
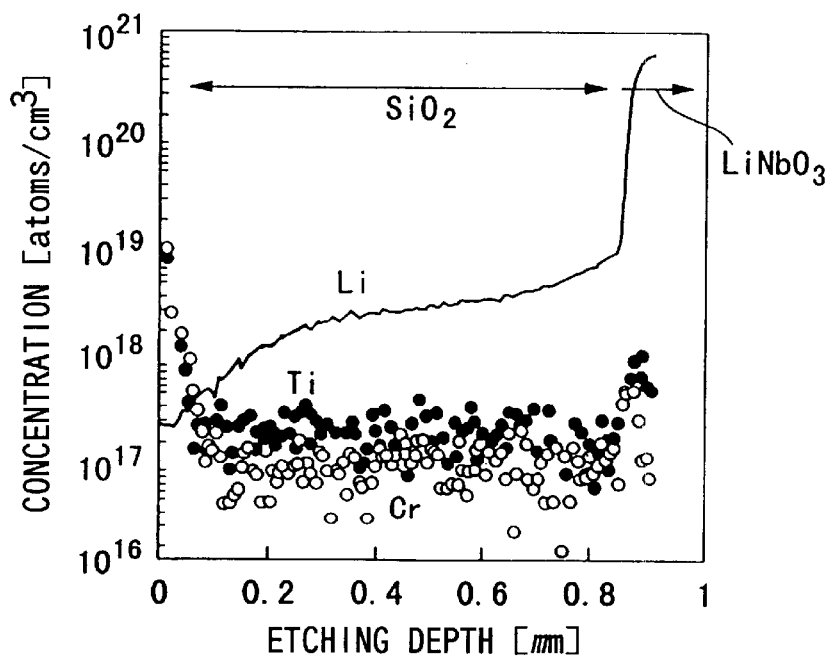
FIG. 15 is a graph showing the contamination condition in the depth wise direction of buffer layer of optical waveguide modulator shown in FIG. 7.

FIG. 12 and FIG. 13 show graphs of the results of the secondary ion mass spectrometry (SIMS) measuring the contamination condition in the depth wise direction of the buffer layer 3 of Embodiment 1. FIGS. 14 and 15 show graphs of the results of the secondary ion mass spectrometry (SIMS) measuring the contamination condition in the depth wise direction of the buffer layer 3 of Conventional Example 1.

In addition, Table 1 shows the amount of impurities which penetrated into the buffer layer 3 of Embodiments 1 to 5 and Conventional Example 1.

As shown in FIGS. 14 and 15, the results of the secondary ion mass spectrometry in the depth wise direction of buffer layer 3 of the Conventional Example 1 indicate that contaminants such as K, B, Ti, Cr, Na (not shown in the figure), and H (not shown in the figure) were detected. In addition, from FIGS. 14 and 15, it is clear that these contaminants are localized in the surface 3a which is the exposed part of buffer layer 3, and a portion of the contaminants has penetrated into the inner part of buffer layer 3.

Of the above-mentioned contaminants, K, B, Ti, and Na originate from the resist developing fluid and the washing fluid used in the manufacturing processes. The Ti is residue of the transition metal layer which was removed by etching. In addition, it is also possible that the Cr, and Ti were present in the etching fluid used to etch the Au film and the transition metal layer.

The Li of FIGS. 12 to 15 is element diffused from the lithium niobate used to form the ferroelectric substrate 10.

On the other hand, it is clear that the concentration of the contaminants K, B, Ti and Cr in Embodiment 1 shown in FIGS. 12 and 13 is lower compared with Conventional Example 1 shown in FIGS. 14 and 15.

In addition, as shown in Table 1, the results show the amount of the impurities (H, Na and K) which penetrated into buffer layer 3 in any of Embodiments 1 to 5 is extremely small when compared with Conventional Example 1.

From this, it is clear that penetration of contaminants into the buffer layer 3 is prevented by the protective films 7 and 73.

In addition, the generation conditions of dc drift which occurred over approximately 1 hour at room temperature (25° C.) was examined for each of the optical waveguide modulators of the Embodiments 1 to 3 and Conventional Example 1.

The results were that there was dc drift generated in Conventional Example 1 in which a large amount of impurities was contained within the buffer layer 3. However, there was no dc drift generated at room temperature in any of Embodiments 1 to 3 in which there was a small amount of impurities contained within the buffer layer 3 compared with the Convention Example 1.

Next, the following test was conducted to investigate the deterioration condition of the transition metal layer 5 due to diffusion of oxygen for the case in which the buffer layer 3 comprised $SiO_2$.

Specifically, with regard to both the optical waveguide modulators of Embodiment 1 and Conventional Example 1, compositional analysis in the depth wise direction from the buffer layer 3 to the electrodes 4 was conducted using an electron spectroscopic analysis device.

Figure 10:
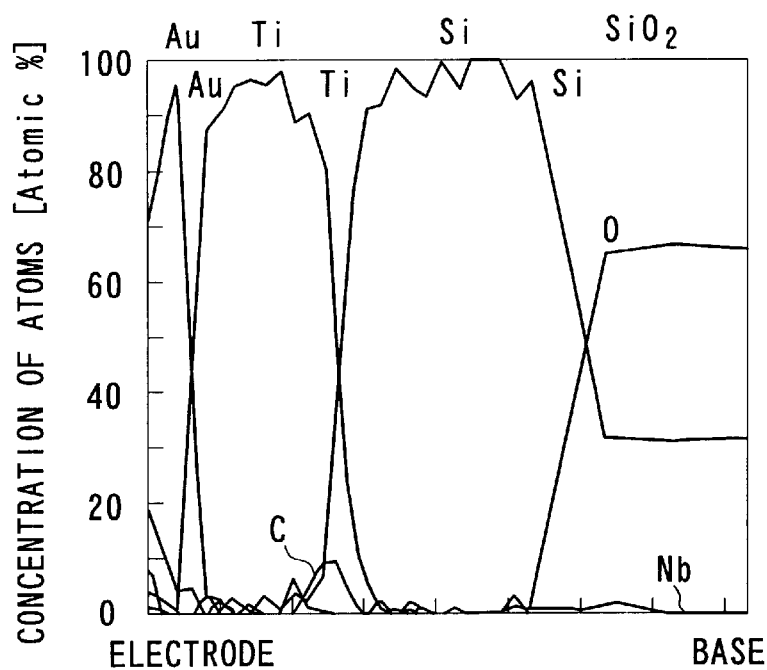
FIG. 10 is a graph showing the results of compositional analysis in the depth wise direction from the buffer layer to the electrodes of Embodiment 1.
Figure 11:
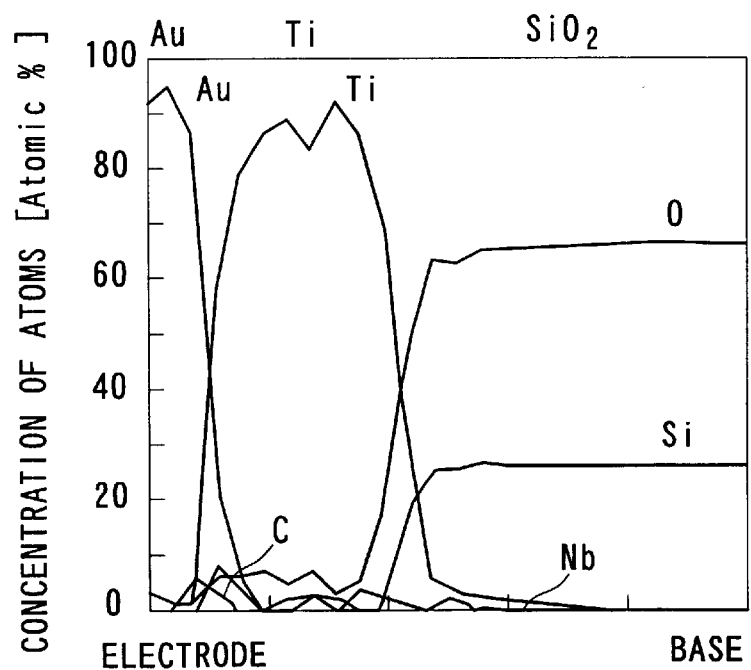
FIG. 11 is a graph showing the results of compositional analysis in the depth wise direction from the buffer layer to the electrodes of Conventional Example 1.

The results are shown in FIGS. 10 and 11. FIG. 10 is a graph showing the results of the compositional analysis of Embodiment 1. FIG. 11 is a graph showing the results of the compositional analysis of the Conventional Example 1.

As shown in FIG. 11, in Conventional Example 1, the amount of oxygen which has penetrated into the transition metal layer 5 (Ti) is about 10 atomic percent.

In contrast to this, as shown in FIG. 10, in Embodiment 1, the amount of oxygen in the transition metal layer 5 (Ti) is below the limit of analysis.

From this, it is clear that by means of the protective film 73 (Si), it is possible to prevent the diffusion of oxygen from the buffer layer ($SiO_2$) to the transition metal layer 5 (Ti) and it is possible to prevent the oxidative degradation of the transition metal layer 5 (Ti).

In addition, the following experiment was conducted in order to study the stability of optical waveguide modulators.

Specifically, the optical waveguide modulators of Embodiment 4 and Conventional Example 1 were placed in thermoregulated bath of 120° C., initial dc biases of various levels were applied and the optical waveguide modulators were operated for 500 hours. While observing the modulation condition of the optical output signals using an oscilloscope, when the modulation condition is such that it is the same as when the initial dc bias was applied, the applied dc bias is feedback-controlled, and the modulation of that applied dc bias is recorded.

Figure 16:
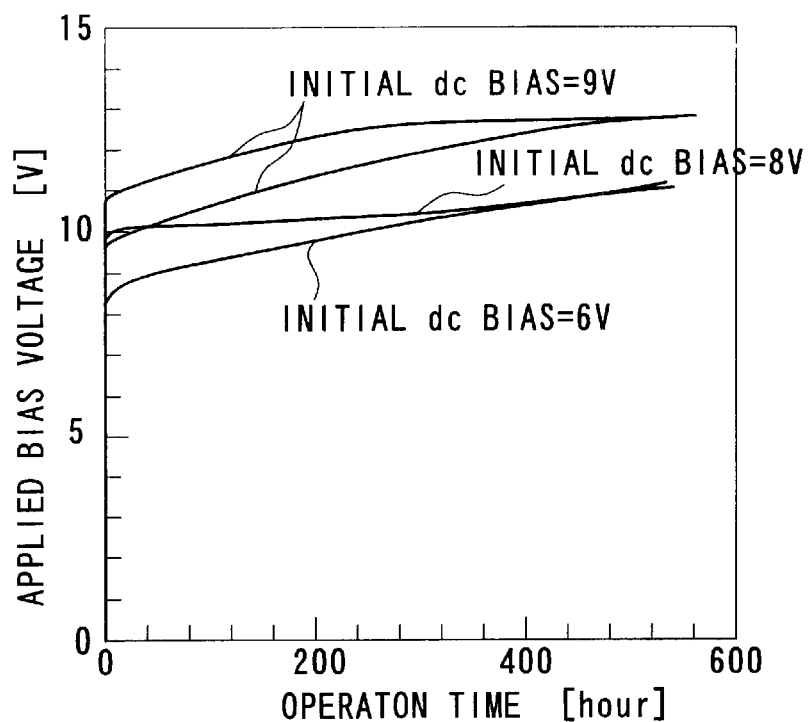
FIG. 16 is a graph showing variation in the applied dc bias of Embodiment 4.
Figure 17:
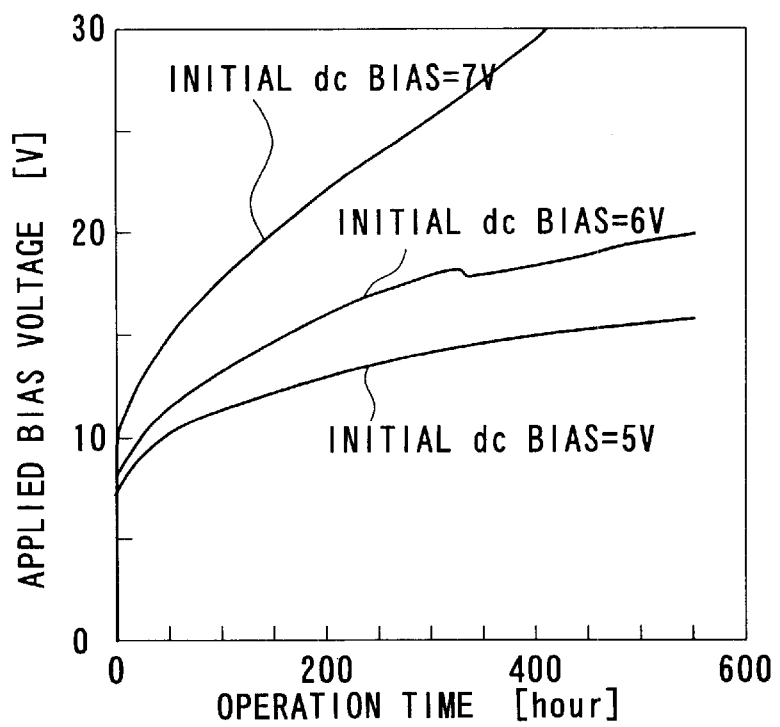
FIG. 17 is a graph showing variation in the applied dc bias of Conventional Example 1.

The results are shown in FIGS. 16 and 17. FIG. 16 is a graph showing the modulation of the applied dc bias of Embodiment 4. FIG. 17 is a graph showing the modulation of the applied dc bias of the Conventional Example 1.

In Conventional Example 1, as shown in FIG. 17, the applied dc bias rises noticeably with the passage of time. On the other hand, as shown in FIG. 16, in Embodiment 4, the rise in the applied dc bias is small compared with Conventional Example 1.

The degree to which the modulation in the applied dc bias is small, the dc drift is small, and the stability of the optical output signal of the optical waveguide modulator is good. Therefore, it can be understood that it is possible to improve the stability of the operation of the optical waveguide modulator by means of the protective film 73.

In addition, the following test was conducted to examine the stability with respect to variation in the temperature of optical waveguide modulator.

Specifically, the modulation condition was observed while the temperature of each of the optical waveguide modulators of Embodiment 4 and Conventional Example 1 were raised from 0° C. to 70° C.

The amount of variation in the modulation condition for both of Embodiment 4 and Conventional Example 1 was, in voltage, approximately 2V. From this, when the ferroelectric substrate 1 is an X-cut, it is clear that there is no negative effect originating from the pyroelectric charge due to variation in temperature even though the protective film 73 has semi-conductivity.

In addition, the film adhesion strength of the optical waveguide modulator was examined.

Specifically, it was investigated whether peeling of the electrodes occurs in the process of manufacturing the optical waveguide modulators of each of Embodiments 1 to 4 and Conventional Example 1.

The results were that peeling of the electrodes occurred with Conventional Example 1 (in particular, in the process of wire bonding on the electrodes). For Embodiments 1 to 4, there was no peeling of the electrodes.

From this, it was possible to confirm that it is possible to improve the film adhesion strength by means of the protective film 73.

As explained in detail above, in the electro-optic element of the present invention, no problems arise due to the pyroelectric effect because the axis in which the electro-optic effect of the ferroelectric substrate is induced is parallel to the main face of the above-mentioned ferroelectric substrate, and therefore, the charge generated by means of the electro-optic effect does not accumulate between the electrodes.

In addition, in the electro-optic element of the present invention, since a protective film is provided on at least the region of the above-mentioned buffer layer on which the above-mentioned electrodes are not formed, the surface of the buffer layer is not exposed, and it is difficult for the surface of the buffer layer and the inside of the buffer layer to be contaminated with contaminants.

Consequently, it is possible to prevent leakage of the electric current applied to the electrodes due to contaminants in the surface of the buffer layer or within the buffer layer, and it is possible to ensure the stability of the operation of the electro-optic element. Consequently, even if the direct current bias is superimposed and applied at radio frequency on the electrodes, it has excellent stability with respect to the application conditions. In addition, it is possible to prevent the generation of dc drift.

In addition, since it is difficult for the buffer layer to be contaminated, it becomes difficult for the degradation in the bonding strength of the buffer layer and the ferroelectric substrate which is the origin of contaminants of the buffer layer to develop.

Furthermore, in this electro-optic element, by providing a protective film over the whole of the above-mentioned buffer layer including the region on which the electrodes are formed, the entirety of the surface of the buffer layer is covered, and it is possible to prevent contamination of the buffer layer during the manufacturing process of the electro-optic element after the protective film has been formed.

In addition, since the protective film is formed on the entirety of the surface of the buffer layer, it is easier to form the protective film compared with a situation in which the protective film is formed on a part of the surface of the buffer layer.

What is claimed is:

1. An electro-optic element comprising:
   a ferroelectric substrate comprising a single crystal having an electro-optic effect, in which an optical waveguide is formed by thermal diffusion of titanium in a main face, and in which an axis in which said electro-optic effect is induced is parallel to said main face;
   a heat treated buffer layer provided on said ferroelectric substrate on a side in which said optical waveguide is formed;
   electrodes provided on a part of said buffer layer;
   a protective film provided over an entirety of a surface of said buffer layer including regions on which said electrodes are formed and on side surfaces of said buffer layer with respect to the optical waveguide direction.

2. An electro-optic element according to claim 1, wherein said protective film provided on said buffer layer and the protective film provided on the side surfaces of aid buffer layer with respect to the optical waveguide direction are made of the same material.

3. An electro-optic element according to claim 1, wherein said protective film is an amorphous film.

4. An electro-optic element according to claim 1, wherein said protective film is electrically insulative.

5. An electro-optic element according to claim 1, wherein said ferroelectric substrate comprises lithium niobate.

* * * * *